Figure 1:
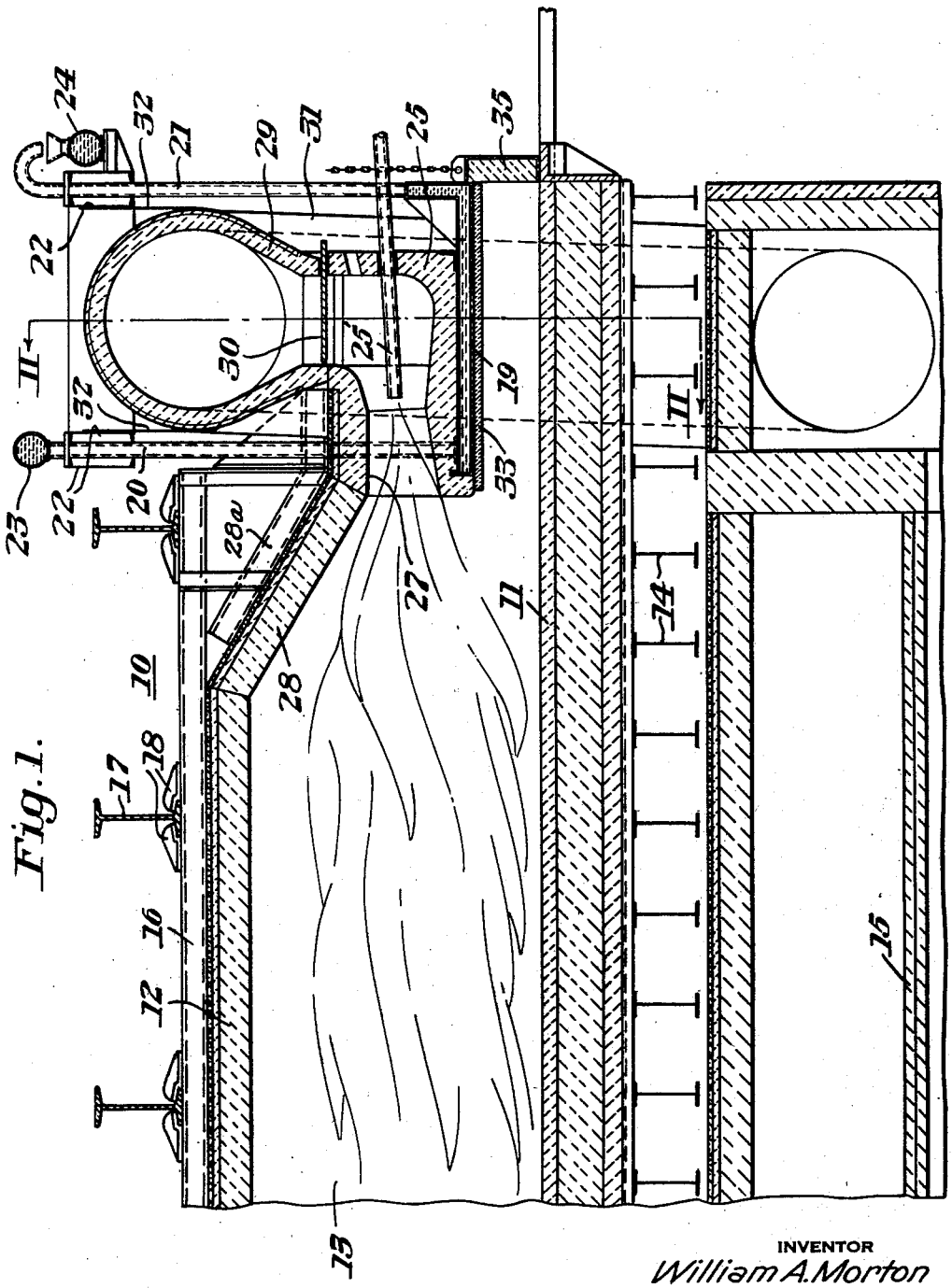

June 13, 1950

W. A. MORTON 2,511,676

BURNER MOUNTING FOR FURNACES

Filed June 12, 1943

2 Sheets—Sheet 1

INVENTOR
William A. Morton
by his attorneys
Stebbins and Blenko

June 13, 1950 W. A. MORTON 2,511,676
BURNER MOUNTING FOR FURNACES
Filed June 12, 1943 2 Sheets-Sheet 2
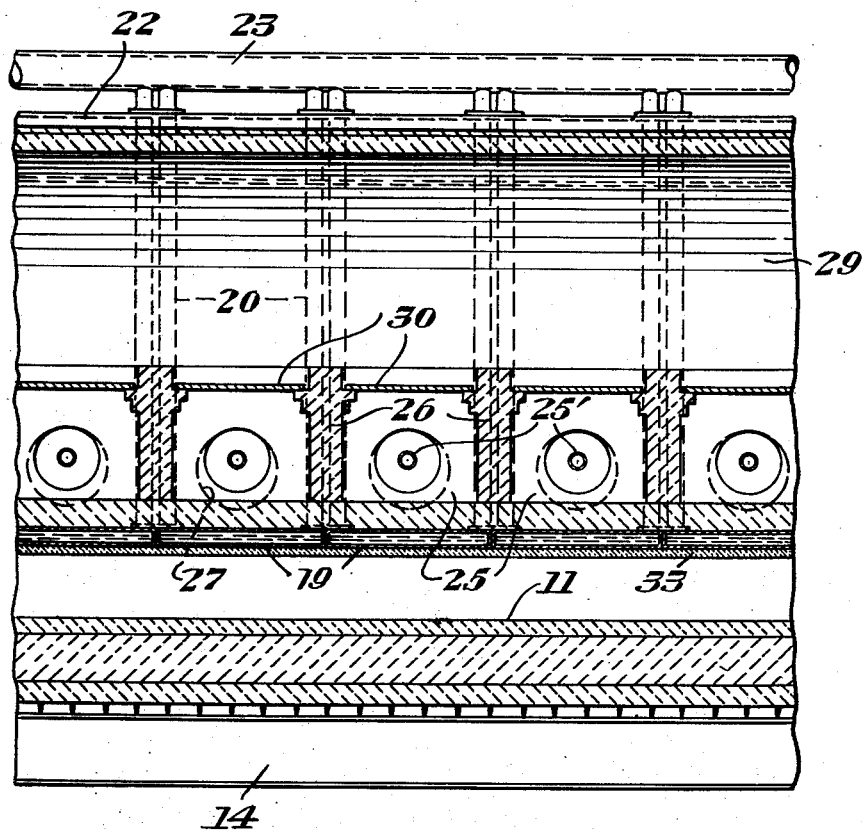
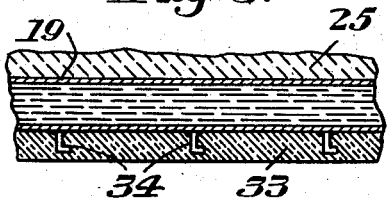
INVENTOR
William A. Morton
by his attorneys
Stebbins and Blenko

UNITED STATES PATENT OFFICE 2,511,676

BURNER MOUNTING FOR FURNACES

William A. Morton, Mount Lebanon, Pa., assignor, by mesne assignments, to Manufacturers Trading Corporation, Cleveland, Ohio, a corporation of Delaware Application June 12, 1943, Serial No. 490,586

4 Claims. (Cl. 263—43)

This invention relates to furnaces and, in particular, to a furnace for heating material such as slabs or the like, for example.

Furnaces for progressively heating material such as slabs, have been variously constructed heretofore but all the types with which I am familiar have several serious disadvantages. In such furnaces it has been customary to provide burners firing longitudinally of the furnace, the burners being disposed near the roof of the furnace at one end, distributed across the width thereof in side by side relation, and so inclined that the burner center line strikes the furnace hearth adjacent the median transverse plane therethrough. This elevated location of the burner is made necessary by the type of the supporting structure which carries the burners and associated parts. It increases the amount of material required in construction and requires a long flue for supplying preheated air to the burners for mixture with the fuel. The considerable length of the hot-air flue involves an excessive drop in the pressure of the air at the point of introduction into the burners. The construction described also places a heavy load upon the supporting structure.

A further disadvantage of furnaces adapted for heating slabs as they have been constructed, is that the flame from the burners does not have a wiping action over the mass of material to be heated. On the contrary, the flame strikes the material in a relatively restricted area and is then deflected up toward the furnace roof. This produces a concentration of heat and frequently results in overheating the material with the formation of an excessive amount of scale in the case of steel slabs. A further disadvantage is that the flame and the material to be heated are widely separated at the entering end of the furnace. As a result the material has to travel a considerable distance along the furnace before being subjected to direct heating. A still further disadvantage is the excessive pressure of gases in the furnace, e. g., .08" of water, which opposes the air supplied to the furnace through the burners.

I have invented a novel furnace construction which largely overcomes the aforementioned objections to forms of construction previously known. In a preferred embodiment, I provide a furnace having a roof, walls, and a hearth adapted to receive the material to be heated. The furnace may conveniently be of the continuous type in which the material is charged cold at one end, pushed through the furnace step by step and gradually heated, and finally discharged from the other end. I provide a series of hollow panels of metal plate disposed horizontally and extending along one wall of the furnace, spaced vertically from the hearth. The panels may conveniently be placed across one end of the furnace, e. g., the entering end, and in this case, the panels are placed high enough above the hearth to permit the introduction therebetween of the material to be heated.

I construct a plurality of burner cells on the horizontal panels which serve as a supporting floor or deck for the burner structure. The panels are supported from above, preferably on means depending from beams extending across the furnace above the burners. The means suspending the panels may conveniently be pipes communicating with the interior thereof adapted to circulate cooling water therethrough. A flue for supplying hot air to the burners is disposed on the cells and communicates therewith. Each cell has a fuel-supply pipe projecting thereinto and a mouth for supplying combustible to the furnace. The burner structure actually replaces the wall of the furnace at the end where the burners are located, the roof adjacent the burners being sloped downwardly to the top of the burner mouths and the space between the burner-supporting panels and the hearth being closed by a suitable door.

Further details, novel features and advantages of the invention will be made clear by the following complete description and explanation which refer to the accompanying drawings illustrating the preferred embodiment referred to above. In the drawings, Figure 1 is a partial longitudinal section taken centrally through a furnace embodying the invention;

Figure 2 is a partial transverse section taken along the plane of line II—II of Figure 1; and Figure 3 shows a portion of Figure 2 to enlarged scale.

Referring now in detail to the drawings a furnace indicated generally at 10 comprises a hearth 11, a main roof portion 12 and walls one of which is indicated at 13. The furnace is built up inside an enclosure of structural members and metal plate. The hearth is carried on beams 14 extending between suitable foundations (not shown), and the space below the hearth is occupied by a recuperator, a portion of which is indicated at 15 whereby preheated air is supplied to the furnace for combustion therein. The main roof portion 12 is suspended from channels 16 carried on beams 17 extending across the furnace above the roof and supported on suitable columns (not shown). Brackets 18 secured to the channels 16 engage the lower flanges of the beam 17 to suspend the channels thereon.

Hollow panels 19 of metal plate are disposed horizontally across one end of the furnace. These panels are suspended on pipes 20 and 21 carried on beams 22 extending across the furnace above the end thereof. The pipes 20 and 21 are in communication with the interior of the panels 19, the pipes 20 also communicating with a manifold 23 for supplying cooling fluid while the pipes 21 discharge into a return duct 24.

Burner cells 25 are constructed on the panels 19 as a supporting floor or deck. The cells 25 are disposed side by side as shown in Figure 2, extend across the end of the furnace and are separated by division walls 26. Each cell has a fuel supply pipe 25' projecting thereinto and is formed with a discharge mouth or port 27 from which combustible flows into the interior of the furnace. The furnace roof includes a portion 28 adjacent the burner cells which slopes downwardly to the level of the tops of the mouths 27.

A hot-air flue 29 is built up on the cells and opens directly thereinto at its bottom. Slidable damper plates 30 are provided to control the volume of air flowing through the several burner cells. The flue 29 extends across the end of the furnace and connects with a vertical flue 31 communicating with the recuperator below the furnace hearth. The flue 29 is carried partly on the burner cells and partly on hangers 32 depending from the beams 22.

It will be observed that the burner cells take the place of the vertical wall of the furnace at the end or side where they are installed as the case may be. In the particular embodiment described, the burner cells are installed across one end of the furnace. The panels 19 and burner cells 25 are disposed above the hearth 11 at a sufficient distance above the hearth 11 to permit the introduction therebetween of the material to be heated such as slabs. The panels 19 are protected from the heat of the furnace by a layer of insulation 33 applied thereto in plastic form and held in place by keying angles 34 welded to the bottom plates of the panels. A liftable door 35 normally closes the end of the furnace between the panels 19 and the hearth.

It will be apparent from the foregoing description that a furnace constructed in accordance with my invention has numerous advantages over heating furnaces as previously constructed. In the first place, the burners in my construction are disposed much closer to the hearth than the burners of known types of furnaces. This results in economy in the use of materials, i. e., firebrick, metal plate and structural members, and also reduces the load on the supporting structure. By disposing the burners as shown, the flame discharged thereby is brought down closer to the material, thus increasing the rate of transfer of heat to the latter. The flow of combustible along the furnace hearth in proximity to the material provides a wiping action effective to displace the static colder gases adjacent the surfaces of the material and increasing the heating rate. The position of the burners also avoids impingement of the flame on a concentrated area of the material and thus prevents local overheating.

The construction disclosed results in a marked diminution of the pressure in the furnace opposing the inflowing combustible. The furnace of my invention is characterized by a gas pressure of only about .03" of water in comparison to .08" of water for furnaces of known construction. My furnace is further characterized by improved combustion at the charging end when the burners are installed thereat because the heated roof surface is thereby brought into proximity with a cone of combustible issuing from the burner cells and thus acts as a flared extension of the mouths thereof. A further advantage of my invention is that the load represented by the furnace roof is supported independently of the water-cooled panels which carry the burner cells and hot air flue.

Although I have illustrated and described but a preferred embodiment of my invention, it will be recognized that changes in the construction disclosed may be made without departing from the spirit of the invention or the scope of the appended claims.

I claim:

1. In a furnace, a hearth, side walls and a roof, a series of water-cooled panels spaced above the hearth at one end of the furnace defining a charging opening, and a series of burner ports disposed side by side across the end of the furnace on said panels, said burner ports being at a level substantially below the main portion of the roof, and directed horizontally above the hearth, and means supplying a combustible mixture to the burner ports including an air duct extending across said end of the furnace above the ports.

2. In a continuous furnace for heating material charged into one end thereof and moved therealong, a hearth, side walls, and a roof spaced above the hearth, a supporting deck of water-cooled panels disposed horizontally above the hearth at one end of the furnace, burner ports built up on said deck, said ports being disposed side-by-side at a level below the main portion of the roof and firing longitudinally of the furnace, and a roof section sloping upwardly from the tops of the ports to said main portion of the roof.

3. In a furnace, a hearth, side walls and a roof, a series of substantially horizontal water-cooled panels spaced above the hearth at one end of the furnace forming a hollow water-cooled lintel above a charging opening, a series of burner ports disposed side by side across the end of the furnace and built up on said panels, and means for supporting said panels independently of said roof.

4. In a furnace, a hearth, side walls and a roof, a series of water-cooled panels spaced above the hearth at one end of the furnace forming a segmental hollow water-cooled lintel above a charging opening, a series of burner ports disposed side by side across the end of the furnace upon the panels, said ports being directed in a plane substantially parallel to the furnace hearth, and means for supporting said panels independently of the roof.

WILLIAM A. MORTON.

REFERENCES CITED

The following references are of record in the file of this patent:

UNITED STATES PATENTS

| Number | Name | Date |
|---|---|---|
| 1,085,138 | Knox | Jan. 27, 1914 |
| 1,680,365 | Cort | Aug. 14, 1928 |
| 1,696,805 | Lehr | Dec. 25, 1928 |
| 1,740,288 | Fries | Dec. 17, 1929 |
| 1,912,933 | Culbertson | June 6, 1933 |
| 2,025,165 | Henry | Dec. 24, 1935 |
| 2,182,497 | Longenecker | Dec. 5, 1939 |

OTHER REFERENCES

Trinks, "Industrial Furnaces," 2nd edition, vol. 2, 1942, published by John Wiley & Sons, pages 322, 323.